T. MOORE.
FASTENINGS FOR COLLARS, CUFFS, &c.
No. 194,099. Patented Aug. 14, 1877.
Fig. 1.
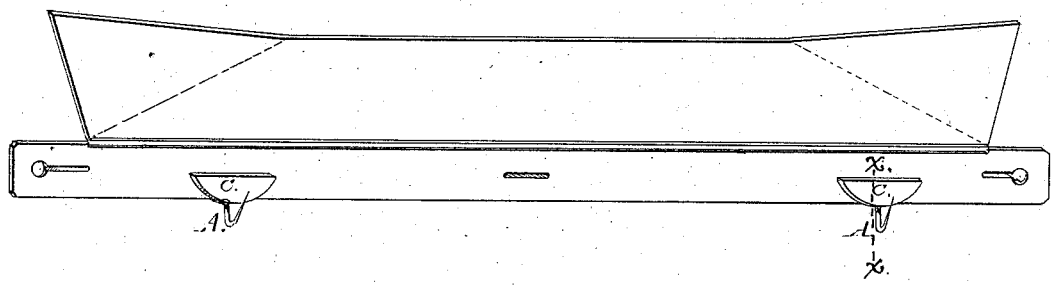
Fig. 2.
Fig. 3.
Fig. 4.
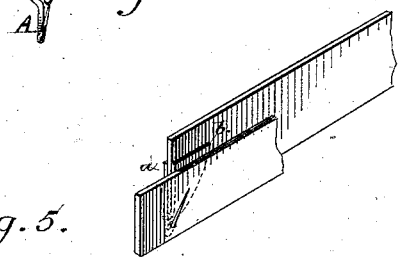
Fig. 5.
Witnesses: August Petersohn, Chester A. Snow.
Inventor: Thomas Moore. By Parker H. Sweet Jr. & Co. his attorneys.

UNITED STATES PATENT OFFICE.

THOMAS MOORE, OF ROCK MART, GEORGIA.

IMPROVEMENT IN FASTENINGS FOR COLLARS, CUFFS, &c.

Specification forming part of Letters Patent No. 194,099, dated August 14, 1877; application filed June 15, 1877.

*To all whom it may concern:*

Be it known that I, THOMAS MOORE, of Rock Mart, in the county of Polk and State of Georgia, have invented a new and useful Device for Fastening Collars, Cuffs, &c., to the Neck and Wristbands of Shirts; and I do hereby declare the following to be a full, clear, and exact description thereof, reference being had to the accompanying drawings, and to the letters of reference marked thereon, which form a part of this specification, and in which—

Figure 1 represents a perspective view of my invention. Fig. 2 represents a section taken on the line $x\,x$ of Fig. 1. Fig. 3 represents a front view. Fig. 4 represents a view of the metallic hook detached from the shield; and Fig. 5 represents my invention as applied to a collar, and connecting the same to a neckband.

Similar letters of reference occurring on the several figures indicate corresponding parts.

My invention has for its object to furnish an improved device for fastening collars and cuffs to the neck and wristbands of shirts, particularly at the sides, where no buttons are provided, and which are usually fastened by ordinary pins, which is objectionable in many respects; and it consists of a metallic hook having a penetrating-point, and a circular or other suitably-shaped eye for adjustment in a connecting shield, all as will be hereinafter more fully described, and pointed out in the claim.

Referring to the drawings, A represents the metallic hook, constructed of round or flat wire, and provided with an eye, B, as shown. C represents a semicircular shield, of cloth, paper, or other suitable material, formed of two parts or thicknesses, $a\,b$, adapted to fold over upon each other, and to confine the eye of the hook between the two at the lower part thereof, as fully shown in Fig. 2.

In attaching the shield C to the collar or cuff, the parts $a\,b$ are placed on opposite sides of the edges of the same, and glued or pasted thereto, as shown in Fig. 5, leaving the hook A projecting below and to the inner side of the collar or cuff, for ready attachment to the neck or wristbands.

I do not limit myself, however, to the above-described manner of adjusting the device to collars and cuffs, as it may be attached near the central part of the same by a circular or oval piece of material glued or pasted thereto, and having the hook A projecting therefrom.

In the operation of my invention the hooks A upon the collar or cuff are thrust into the neck or wristbands and pulled upward, thereby firmly holding the two together when upon the person of the wearer.

The advantages of my invention will be readily apparent, and the construction and operation clearly understood, without a more minute description.

Having thus described my invention, what I claim as new and useful is—

As an improved article of manufacture, the hereinbefore-described device for attaching collars and cuffs to neck and wristbands, consisting of the metallic hook A, having eye B, and shield C, formed of the two parts $a\,b$, substantially as described.

THOS. MOORE.

Witnesses:
  S. K. HOGUE,
  W. H. WILLIAMS.